United States Patent [19]
Shimada

[11] Patent Number: 6,034,815
[45] Date of Patent: Mar. 7, 2000

[54] LASER SCAN MICROSCOPE

[75] Inventor: Masakazu Shimada, Tokyo, Japan

[73] Assignee: Olympus Optical Co., Ltd., Tokyo, Japan

[21] Appl. No.: 09/267,044

[22] Filed: Mar. 12, 1999

[30] Foreign Application Priority Data

Mar. 18, 1998 [JP] Japan .................................. 10-068394

[51] Int. Cl.[7] ........................... G02B 21/06; G02B 21/08; G02B 6/00
[52] U.S. Cl. .......................... 359/388; 359/389; 359/385
[58] Field of Search .................................. 359/388, 385, 359/386, 387, 389, 390

[56] References Cited

U.S. PATENT DOCUMENTS

| | | | |
|---|---|---|---|
| 4,278,353 | 7/1981 | Ostermayer, Jr. | 356/416 |
| 5,659,642 | 8/1997 | King et al. | 385/16 |
| 5,675,145 | 10/1997 | Toda et al. | 250/234 |

FOREIGN PATENT DOCUMENTS 9-15505  1/1997  Japan .

*Primary Examiner*—Jon Henry
*Attorney, Agent, or Firm*—Frishauf, Holtz, Goodman, Langer & Chick, P.C.

[57] ABSTRACT

A laser scan microscope comprises a laser scanning observation optical system for irradiating a sample with a laser beam while scanning the beam over the sample, and detecting the beam transmitted through the sample by means of a detector after the beam passes through a condenser lens, an ordinary observation optical system for irradiating the sample through the condenser lens by means of an illumination lamp, so that a transmitted image of the sample is allowed to be observed, and an optical transmission fiber array having a two-pronged structure having a first optical path extending from a condenser lens-side to the detector and a second optical path extending from the condenser lens-side to the illumination lump. The optical transmission fiber array receives a laser beam from the condenser lens-side and introduces the received beam to the detector by use of the first optical path, and the optical transmission fiber array receives light emitted from the illumination lump and introduces the light to the condenser lens by use of the second optical path.

6 Claims, 2 Drawing Sheets

LASER SCAN MICROSCOPE

BACKGROUND OF THE INVENTION

The present invention relates to a laser scan microscope which irradiates a sample with a laser beam while scanning the laser beam over the sample, detects the light beam transmitted through the sample by means of a detector to obtain an image of the sample, and observes the obtained image.

A laser scan microscope has a laser scanning observation optical system which scans a laser beam over a sample (focal surface), and detects the beam transmitted through the sample by use of a detector. The laser scan microscope may have an ordinary observation optical system in which an image of the sample is observed with the naked eye (the observer) or another method, in addition to the laser scanning observation optical system.

The laser scan microscope having both the above optical systems is disclosed in Jpn. Pat. Appln. KOKAI Publication No. 9-155505. The microscope disclosed in this Publication has a mechanism using an optical path-switching reflecting mirror for selectively switching the optical path of the laser scanning observation optical system and the optical path of the ordinary observation optical system.

More specifically, when the laser scanning observation optical system is used, a laser beam emitted from a light source is transmitted through the sample, and guided to a condenser lens. The laser beam transmitted through the condenser lens is deflected by the optical path switching mirror, transmitted through a pupil relay lens unit (for the transmitted beam through the sample), and reaches the detector. Image processing is carried out on the basis of light intensity distribution detected by the detector, and the processed image is displayed on a monitor.

On the other hand, when the ordinary observation optical system is used, the optical path-switching reflecting mirror is retreated from an optical path. Thus, the light radiated from the illumination lamp, which serves as a light source of the ordinary observation optical system, is not reflected by the reflecting mirror, but travels along the same optical path as in the laser scanning observation optical system in the reverse direction to the beam traveling in the case of using the laser scanning observation optical system. Therefore, the light is transmitted through the condenser lens, and illuminates the sample. The light transmitted through the sample is introduced to an eyepiece, as a result of which an image of the sample is observed with the naked eye through the eyepiece.

Since the above conventional microscope has a structure wherein an image of a pupil of the condenser lens is projected onto the detector, if the accuracy with which the reflecting mirror reflects the transmitted beam is low, the beam inclines with respect to the detector when it is incident thereon. Consequently, there is a case where the intensity of the beam is not accurately detected, and thus an obtained image has unevenness. In order to solve this problem, it is necessary to provide a mechanism for driving the reflecting mirror to retreat it with high accuracy, thus increasing the size of the microscope.

Moreover, in the laser scanning observation optical system, if condenser lens units having different pupil positions are provided, it is necessary to provide pupil relay lens units respectively associated with the condenser lens units. Thus, each time one of the condenser lenses is exchanged for the other, one of the pupil relay lens units must also be exchanged for the other. Although exchanging of the pupil relay lens units does not adversely affect observation using the ordinary observation optical system, the apparatus is complicated and enlarged anyway.

BRIEF SUMMARY OF THE INVENTION

In view of the foregoing, the object of the present invention is to provide a laser scan microscope which does not need a mechanism for switching an optical path of a laser scanning observation optical system and an optical path of an ordinary observation optical system, whereas the mechanism is located between the condenser lens and detector in the conventional microscope, and which can obtain a fine image not having unevenness, without the need to use a pupil relay lens for projecting the beam transmitted through a sample onto the detector.

According to one aspect of the present invention, there is provided a laser scan microscope comprising:

a laser scanning observation optical system for irradiating a sample with a laser beam while scanning the beam over the sample, and detecting the beam transmitted through the sample by means of a detector after the beam passes through a condenser lens;

an ordinary observation optical system for irradiating the sample through the condenser lens by means of an illumination lamp, so that a transmitted image of the sample is allowed to be observed; and an optical transmission fiber array having a two-pronged structure having a first optical path extending from a condenser lens-side to the detector and a second optical path extending from the condenser lens-side to the illumination lump, wherein the optical transmission fiber array receives a laser beam from the condenser lens-side and introduces the received beam to the detector by use of the first optical path, and the optical transmission fiber receives light emitted from the illumination lump and introduces the light to the condenser lens by use of the second optical path.

By using the optical transmission fiber array having two-pronged structure, detection by the scanning observation optical system and illumination by the ordinary observation optical system can be performed without the need for optical path switching. Therefore, the microscope according to the present invention does not need to have a mechanism for switching the optical paths, e.g., an optical path-switching reflecting mirror, which must be provided in the aforementioned conventional microscope. Thus, the structure of the optical microscope of the present invention is simpler than that of the conventional microscope.

According to one embodiment, it is preferable that an incidence/emission face of the optical transmission fiber array, which is opposite to the condenser lens-side, should be located to have an optically conjugate relationship with the condenser lens.

According to another embodiment, the optical microscope further comprises an optical element, removably provided in a position through which the beam transmitted through the sample travels toward the optical transmission fiber array, for diffusing the beam transmitted through the sample.

By virtue of this structure, the laser beam transmitted through the sample is diffused, thus obtaining an excellent image of the sample, which does not have unevenness which would occur due to an error in the conventional optical path-switching mechanism, e.g., the mirror. Furthermore, the beam transmitted through the sample is diffused, as a result of which a fine image can be obtained not having unevenness, which would occur due to an error in positioning of the optical element, and the accuracy with which the condenser lens projects the beam and that with which the detector is located in its light detection position do not need to be high.

It is preferable that the optical element be a frosted (semi-transparent) plate.

Furthermore, in the microscope according to the other embodiment, the condenser lens includes a plurality of condenser lenses which have different pupil positions, and which are held such that a selected one of the plurality of condenser lenses can be exchanged for the other.

By virtue of this structure, the microscope does not need a pupil relay lens, since it has the optical element which is designed to divert the light as mentioned above. Accordingly, unlike the conventional optical microscope, it is not necessary that each time one of the condenser lenses is exchanged for the other, one of pupil relay lens units is also exchanged for the other.

Moreover, the optical microscope according to a still another embodiment comprises a member, removably provided in a position through which the light emitted from the illumination lamp travels toward the fiber, for shutting out the light emitted from the illumination lamp.

By virtue of this structure, the light radiated from the lamp does not adversely affect observation using the laser scanning observation optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be explained with reference to FIGS. 1 to 5.
(First embodiment)

The first embodiment of the present invention will be explained with reference to FIG. 1.

Figure 1:
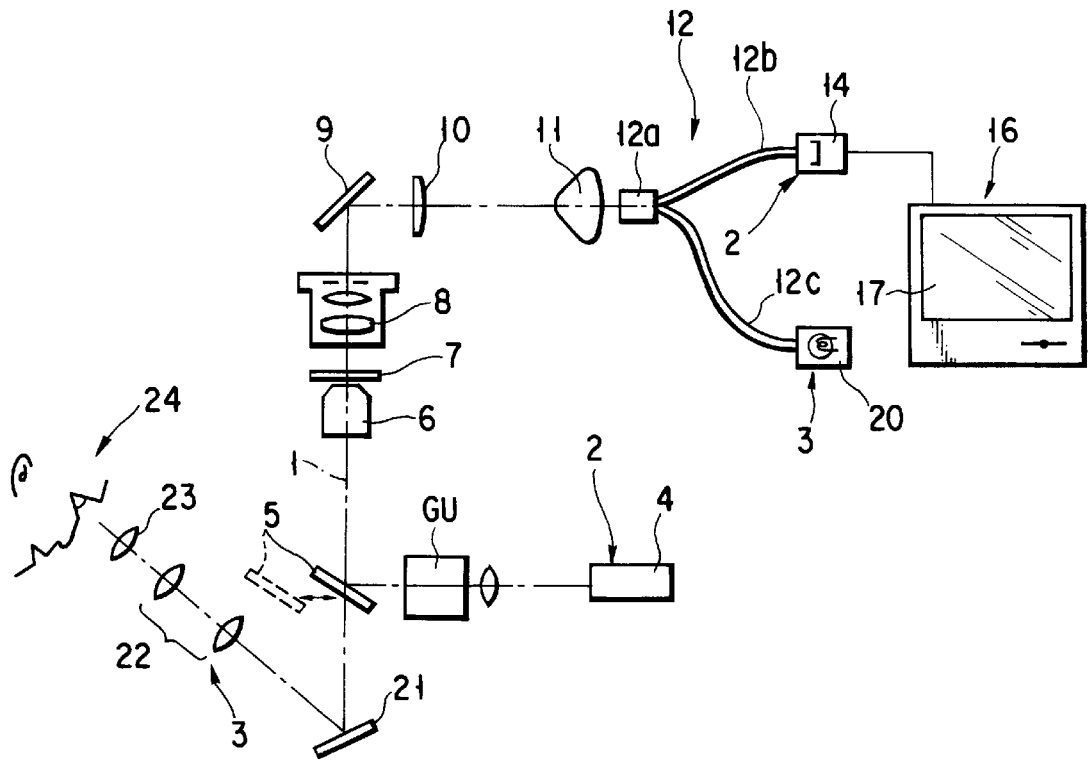
FIG. 1 is a schematic view illuminating the first embodiment of the present invention.

FIG. 1 is a schematic view showing an inverted type of a laser scan microscope.

The microscope has a laser scanning observation optical system 2 and an ordinary observation system 3, which have a common optical path 1 (optical axis). The laser scanning observation optical system 2 and the ordinary observation system 3 will be explained separately.

First, the laser scanning observation optical system 2 will be explained.

The laser scanning observation optical system has a light source 4 which emits a laser beam. The laser beam emitted from the light source 4 is deflected by an optical switching prism 5, incident onto an objective lens 6, and converged onto a sample 7 (focal surface). At this time, the beam is scanned over the sample 7 in XY directions by a light deflector GU such as a galvano-mirror unit GU. After passing through the sample 7, the beam travels through a condenser lens 8, and is incident onto a reflecting mirror 9. The reflecting mirror 9 reflects the beam so that the beam is transmitted along a horizontal optical path. Thus, the beam travels through a relay lens 10 and a collector lens 11, both provided along the horizontal optical path.

The beam transmitted through the collector lens 11 is incident onto an optical transmission fiber array 12. The optical transmission fiber array 12 has two-pronged structure, which has a horizontal optical path portion 12a, a detection optical path portion 12b (first optical path) and an illumination optical path portion 12c (second optical path). The optical path portions 12b and 12c extend from the horizontal optical path portion 12a. An end face of the horizontal optical path portion 12a (an incidence/emission face of the optical transmission fiber array 12) is located to have a conjugate relationship with the condenser lens 8. An end face of the detection optical path portion 12b is connected to a detector 14 of the laser scanning observation optical system 2.

Figure 2:
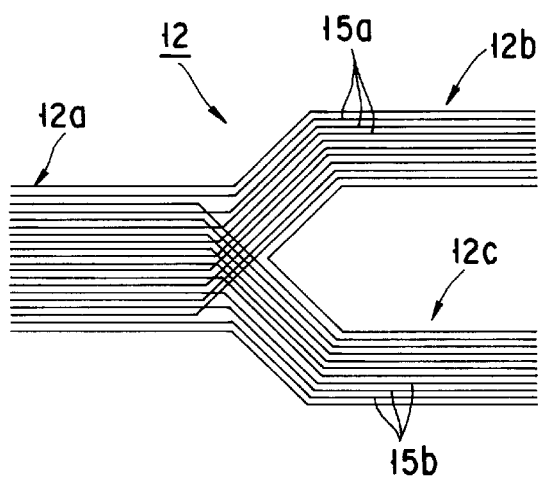
FIG. 2 is a schematic view showing the structure of an optical transmission fiber array provided in the first embodiment.

FIG. 2 is aschematic view showing the structure of the optical transmission fiber array 12. The optical transmission fiber array 12 has a plurality of bundles 15a and 15b having a considerably small diameter and a light transmitting function. The bundles 15a and 15b are bundled into the horizontal optical path portion 12a. It is preferable that the optical transmission fiber array 12 be flexible as a whole.

By virtue of the above structure, the laser beam transmitted through the collector lens 11 travels into the optical transmission fiber array 12 from the end face of the horizontal optical path portion 12a, and then divided, and travels into the detection optical path portion 12b and the illumination optical path portion 12c. The laser beam entering the detection optical path portion 12b is incident onto the detector 14.

The detector 14 is a photoelectric conversion element which can generate an electric signal representing the amount of light incident onto the detector 14. For example, a photomultiplier is adopted as the detector 14. The photoelectric conversion element adopted as the detector 14 has only to produce an electric signal representing the amount of incident light with high precision. Therefore, a phototransistor, a CdS cell, a solar battery or the like can be adopted as the detector 14, if it can generate the electric signal with high precision.

The electric signal output from the detector 14 is fetched by a computer 16, which is provided to display an image of the sample 7 on a monitor 17 after carrying out image processing.

Next, the ordinary observation optical system 3 will be explained.

The ordinary observation optical system 3 has an illumination lamp 20 (such as a halogen lamp or a mercury lamp) as shown in FIG. 1. The illumination lamp 20 is fixed to an end portion of the illumination optical path portion 12c. The light from the illumination lamp 20 travels through the illumination optical portion 12c and the horizontal optical path portion 12a in this order, passing through the collector lens 11 and the relay lens 10, reflecting from the reflecting mirror 9, and traveling through the condenser lens 8. The sample 7 is illuminated with the light transmitted through the condenser lens 8.

In the case where the sample 7 is observed by the ordinary observation optical system 3, the optical path switching prism 5 is retreated to a position indicated by a dotted line in FIG. 1. Therefore, the light transmitted through the sample 7 travels through the objective lens 6, a turn-around mirror 21, and a relay lens system 22, and then is introduced to an eyepiece 23.

Therefore, an observer 24 can position the sample 7 or observe it with the naked eye through the eyepiece 23.

Next, an example of the operation of the microscope having the above structure will be explained.

First of all, the observer 24 determines a position in which the sample 7 is observed by using the ordinary observation optical system 3. In the case where the sample 7 is positioned or observed with the ordinary observation optical system 3, the illumination lamp 20 is operated after the optical path switching prism 5 is retreated. In this case, illumination of the illumination lamp 20 is ideally performed (it is Koehler illumination), since the end face (incidence/emission face) of the horizontal optical path portion 12a of the optical transmission fiber array 12 is provided to have a conjugate relationship with the condenser lens 8.

Therefore, the observer 24 can observe an image of the sample 7, which does not have unevenness, through the eyepiece 23.

On the other hand, in the case where the sample 7 is observed with the laser scanning observation optical system 2, the optical switching prism 5 is located in a position indicated by a solid line in FIG. 1. Then, the light source 4 is operated, and a light deflector GU is operated, thereby to scan a laser beam over the sample 7 (focal surface) in the XY directions.

The laser beam transmitted through the sample 7 is detected by the detector 14 fixed to the detection optical path portion 12b of the optical transmission fiber 12. Then, image processing is performed on the basis of the electric signal output the detector 14, and the processed image is displayed on the monitor 17. Thus, the observer 24 can observe the image through the monitor 17.

In the microscope according to the above embodiment, two optical paths, i.e., the detection optical path and the illumination optical path are joined together as explained above. Thus, it is unnecessary to provide an optical mechanism for switching the optical paths, such as a reflecting mirror, between the condenser lens 8 and the detector 14. Therefore, the structure of the microscope is simple and compact.

(Second embodiment)

Figure 3:
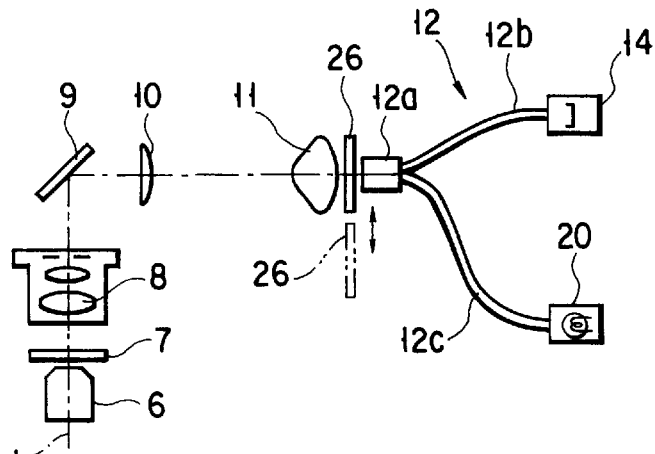
FIG. 3 is a schematic view showing the second embodiment of the present invention.

The second embodiment will be explained with reference to FIG. 3. With respect to the second embodiment, structural elements identical to those in the first embodiment will be denoted by the same reference numerals, and their detailed explanations will be omitted.

The second embodiment, as well as the first embodiment, relates to an inverted type optical microscope. It differs from the first embodiment in the following regard:

In the microscope according to the second embodiment, a frosted plate (semi-transparent plate) 26 is removably inserted between the collector lens 11 and the incidence/emission face of the optical transmission fiber 12.

When the laser scanning observation optical system 2 is used, the frosted plate 26 is inserted in the above manner and located on an optical axis 1, and serves to diffuse the laser beam transmitted through the sample 7. On the other hand, when the ordinary observation optical system 3 is used, the frosted plate 26 is retreated to a position indicated by a dotted line in FIG. 3.

This structure effectively prevents unevenness from occurring in an image obtained on the basis of the light intensity distribution detected by the detector 14.

To be more specific, if the laser scanning observation optical system 2 is used without locating the frosted plate 26 on the optical axis 1, when the beam transmitted through the collector lens 11 is inclinatorily incident onto the horizontal optical path portion 12a of the optical transmission fiber 12, it is also inclinatorily incident onto the detector 14. As a result, there is a possibility that the beam intensity distribution could not accurately be detected, and an obtained image may have unevenness.

On the other hand, when the frosted plate 26 is located on the optical axis 1, the beam is diffused and uniformly incident onto the optical transmission fiber array 12. Therefore, the uniform light is reliably detected by the detector 14, and an obtained image does not have unevenness.

Furthermore, in the case of using the ordinary observation optical system 3, the frosted plate 26 is retreated from the optical axis 1. As a result, Koehler illumination can be achieved without decreasing the amount of the light in the same manner as in the first embodiment.

In the above case, it suffices that the frosted plate 26 is retreated. In other words, the frosted plate 26 does not accurately be positioned. Thus, the microscope is not required to be enlarged.

(Third embodiment)

Figure 4:
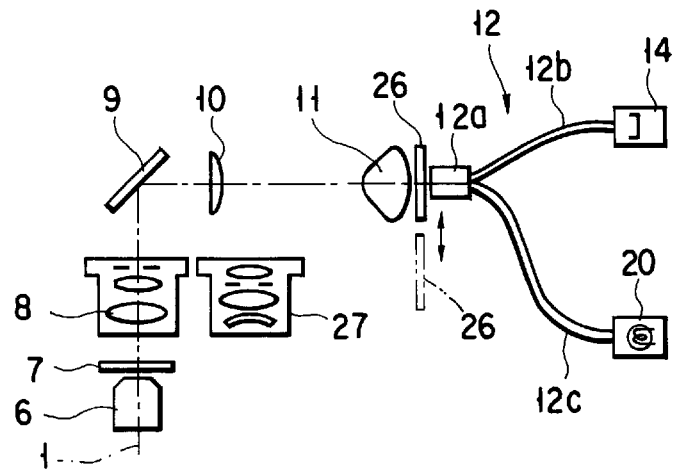
FIG. 4 is a schematic view showing the third embodiment of the present invention.

The microscope according to the third embodiment will be explained with reference to FIG. 4.

In addition to the structure of the microscope according to the second embodiment (shown in FIG. 3), the microscope according to the third embodiment has a switch condenser lens 27 (hereinafter referred to as a second condenser lens 27) differing in pupil position from the condenser lens 8 (hereinafter referred to as a first condenser lens 8), both held such that the first condenser lens 8 and the second condenser lens 27 can be exchanged for each other.

With respect to the third embodiment, an explanation will be made by referring to only the operation performed when the first condenser lens 8 is exchanged for the second condenser lens 27.

The second condenser lens 27 and the first condenser lens 8 project the beam transmitted through the sample 7 in different positions, since those condenser lenses, as stated above, differ from each other in pupil position. However, in the third embodiment, the transmitted beam is diffused by the frosted plate 26 before being detected by the detector 14. Therefore, even when any of the condenser lenses 8 and 27 is used, an image not having unevenness can be necessarily obtained, regardless of the difference in pupil position between the condenser lenses 8 and 27.

Therefore, the microscope according to the third embodiment has a structure wherein a plurality of condenser lenses (8, 27) having different pupil positions are exchangably provided, and in addition, the structure is simple since it is not necessary to provide pupil relay lens units respectively associated with the condenser lenses, which are necessary for the conventional microscope.

(Fourth embodiment)

Figure 5:
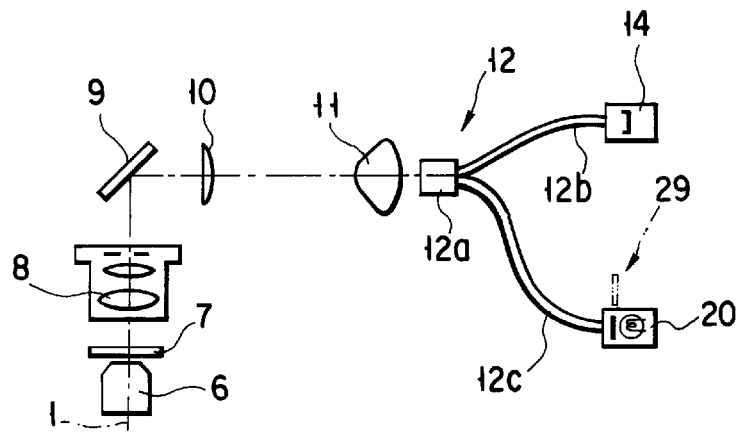
FIG. 5 is a schematic view showing the fourth embodiment of the present invention.

The fourth embodiment of the present invention will be explained with reference to FIG. 5.

In addition to the structure of the microscope according to the first embodiment, the microscope according to the fourth embodiment has a shutter device 29 for shutting an optical path between the illumination lump 20 and the optical transmission fiber array 12. In the case of operating the laser scanning observation system 2, the shutter device 29 shuts the light emitted from the illumination lump 20. Thus, needless to say, the light is not reflected by the collector lens 11 or transmitted onto the detector 14.

To be more specific, when observation is performed by use of the laser scanning observation optical system 2, the shutter device 29 is operated to shut out the light emitted from the illumination lump 20. On the other hand, when observation is performed by using the ordinary observation optical system 3, the shutter device 29 is retreated to open the above optical path, so that the sample 7 is illuminated with the light emitted from the illumination lump 20.

In the above case, it is preferable that the application of a voltage to the detector 14 and the operation of the shutter device 29 be controlled in association with each other by using the computer 16.

By virtue of the above structure, when observation is performed with the laser scanning observation optical system 2, there is no possibility that the light from the lamp 20 may be reflected by the collector lens 11. As a result, observation using the laser scanning observation optical system 2 is not adversely affected, and thus it is satisfactorily performed.

Moreover, in the above explanation, observation using the above ordinary observation optical system is discussed by referring to eye observation using an optical member such as an eyepiece. However, it is not limited to such eye observation. For example, a television camera may be used.

As explained above, according to the present invention, it is unnecessary to provide a mechanism for switching the optical paths of the laser scanning observation optical system and ordinary observation optical system. In addition, a fine image not having unevenness can be obtained without the need to exchange one of pupil relay lens units for a transmitted beam for the other even when one of the condenser lenses is exchanged for the other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A laser scan microscope comprising:

a laser scanning observation optical system for irradiating a sample with a laser beam while scanning the beam over the sample, and detecting the beam transmitted through the sample by means of a detector after the beam passes through a condenser lens;

an ordinary observation optical system for irradiating the sample through the condenser lens by means of an illumination lamp, so that a transmitted image of the sample is allowed to be observed; and an optical transmission fiber array having a two-pronged structure having a first optical path extending from a condenser lens-side to the detector and a second optical path extending from the condenser lens-side to the illumination lamp;

wherein the optical transmission fiber array receives a laser beam from the condenser lens-side and introduces the received beam to the detector by use of the first optical path, and the optical transmission fiber array receives light emitted from the illumination lamp and introduces the light to the condenser lens by use of the second optical path.

2. The microscope according to claim 1, wherein the optical transmission fiber array has an incidence/emission face which is opposite to the condenser lens-side, and located to have an optically conjugate relationship with the condenser lens.

3. The microscope according to claim 1, which further comprises an optical element, removably provided in a position through which the beam transmitted through the sample from the condenser lens travels toward the optical transmission fiber array, for diffusing the beam transmitted through the sample.

4. The microscope according to claim 3, wherein the condenser lens includes a plurality of condenser lenses which have different pupil positions, and which are held such that a selected one of the plurality of condenser lenses is allowed to be used.

5. The microscope according to claim 3, wherein the optical element comprises a frosted plate which is semi-transparent.

6. The microscope according to claim 1, which further comprises a member, removably provided in a position through which the light emitted from the illumination travels toward the fiber array, for shutting out the light emitted from the illumination lamp.

* * * * *